United States Patent [19]
Fox et al.

[11] 4,095,739
[45] Jun. 20, 1978

[54] SYSTEM FOR LIMITING ACCESS TO SECURITY SYSTEM PROGRAM

[75] Inventors: Robert J. Fox, Los Angeles; Donald P. Sturgis, Clairmont, both of Calif.

[73] Assignee: A-T-O Inc., Willoughby, Ohio

[21] Appl. No.: 827,993

[22] Filed: Aug. 26, 1977

[51] Int. Cl.² ............................ G06K 5/00; G08G 1/14
[52] U.S. Cl. ......................................... 235/382; 340/51
[58] Field of Search ................. 235/382, 380, 375; 340/149 A, 152 R, 51

[56] References Cited
U.S. PATENT DOCUMENTS

| | | | |
|---|---|---|---|
| 3,846,622 | 11/1974 | Meyer | 235/382 |
| 3,857,018 | 12/1974 | Stork et al. | 235/382 |
| 3,988,570 | 10/1976 | Murphy et al. | 235/382 |

*Primary Examiner*—Daryl W. Cook
*Attorney, Agent, or Firm*—Knobbe, Martens, Olson, Hubbard & Bear

[57] ABSTRACT

A security system in which access at remote locations is limited to personnel inserting in the system a coded data card, the data of which compares favorably with data stored in a memory. The memory data comprises a table which permits access to selected terminals by selected personnel at selected times. Programming access to the system for the purpose of altering data in the access authorization table is limited to individuals who insert a supervisor's card into the system, which card enables the logic required for altering the authorization table.

13 Claims, 2 Drawing Figures

SYSTEM FOR LIMITING ACCESS TO SECURITY SYSTEM PROGRAM

BACKGROUND OF THE INVENTION

This invention relates to security systems in which access is selectively permitted on the basis of data encoded onto a card which a user inserts into receptacles at remote locations in the system. More specifically, the invention pertains to a system for limiting access to the programming functions for such a security system, so that only those personnel who insert specially encoded cards are entitled to change the control index listing of the system. This listing is used to provide data as to those personnel who are entitled to access at specific remote locations at specific times.

Prior art static magnetic card readers for controlling access through electrically operable devices, such as doors, turnstiles, printers, etc., have been utilized for some time. Such systems typically include cards on which data is encoded, the data being used for controlling access. The card or badge is typically inserted into the slot of a reader which reads and decodes the encoded data on the card. Advantageously, the data is encoded as a plurality of magnetically polarized spots in a strip of magnetic material. Such encoded data normally includes an identification number or numbers identifying the card holder. During use, this number encoded by the card is compared with a number or numbers stored either in the remote terminal or in a central computer terminal to ascertain whether the individual inserting the card is entitled to access to a building, room, parking lot, or the like, at the particular time of day at which the card is inserted.

In one prior art embodiment, the magnetically polarized spots are used to directly actuate a reed relay or other moving switch mechanism located within the reader. The state of the art system is exemplified by U.S. Pat. No. 3,686,479 entitled Static Reader System for Magnetic Cards, assigned to A-T-O Inc., assignee of the present invention, employing electromagnetic solid state sensors disclosed and claimed in U.S. Pat. No. 3,717,749, also assigned to A-T-O Inc. The use of such devices in an on-line system employing a central processor and plural remote units is described in U.S. Pat. No. 4,004,134, also assigned to A-T-O Inc. Such systems have been found to be very reliable and are in use as access control systems in a number of different industries, universities, and in government installations.

It has been common in the prior art to include control storage in such systems which store a list of personnel ID numbers, along with data defining which remote terminals shall be open to which particular employees at specific times of day. In systems which have not included a central processor (where each remote location includes a stand-alone terminal), this storage for identifying employees and times of day for access through that particular terminal is located in the remote terminal itself. In those prior art systems embodying a central processor, it has been common to utilize the remote unit to transmit identification data read from the identification card to the central processor. At the central processor, this identification data is utilized as an address to locate data in a table which defines those remote terminals and times of day at which this particular individual is allowed access. This latter system is described in some detail in U.S. Pat. No. 4,004,134, which is hereby incorporated by reference.

Such prior art systems have typically permitted the owner or operator of the secured facility to change the look-up table and thereby alter which employees have access through which remote locations at particular times of day. The security of the entire system of such prior art devices, however, is degraded by utilizing devices such as keylocks to limit access to the program control for changing the data in the control storage. Thus, it is typical in prior art installations to include a keyboard within the central processor (or a remote terminal in a stand-alone system), which keyboard is protected by lock and key from unauthorized access. In order to alter the control storage, one has only to physically break into the system, and one could then freely program the storage to permit access to unauthorized persons at particular times of day and particular remote units as one might choose. Since the security of the system is only as effective as the security of this control storage, such prior art systems are susceptible to clandestine entry by persons familiar enough with the system to be able to program it and capable of physically breaking into the locked enclosure.

SUMMARY OF THE INVENTION

The present invention alleviates this difficulty associated with the prior art systems by requiring, before reprogramming of the control storage is permitted, the insertion into the system of an encoded data identification card which favorably compares with data in a buffer identifying programmers or supervisors. Thus, it is possible, utilizing the present invention, to use the card encoded data as a source of information, not only for limiting access to remote terminals, but, in addition, for limiting access to the central processor or remote terminal control storage which controls such access. It may be possible, of course, to include, in addition, a keylock system for permitting programming access, but the use of the data encoded card provides a degree of safety not available in the prior art systems, since mere physical abuse will not permit system programming access.

In summary, the present invention provides for data encoded card access to the programming portion of a card data security system, and permits the convenient alteration by a supervisor or programmer of a data table which supplies information relating to selective access at selected remote locations within the system.

These and other advantages of the present invention are best understood through the following detailed description of a preferred embodiment which, in turn, references the drawings in which:

FIG. 1 is a schematic block diagram illustration of the present invention as it is incorporated in an on-line system; and FIG. 2 is a schematic block diagram illustration of the present invention as incorporated in an alternate embodiment security system, namely a system in which the remote units are stand-alone or off-line units.

DETAILED DESCRIPTION OF THE PREFERRED EMBODIMENT

Figure 1:
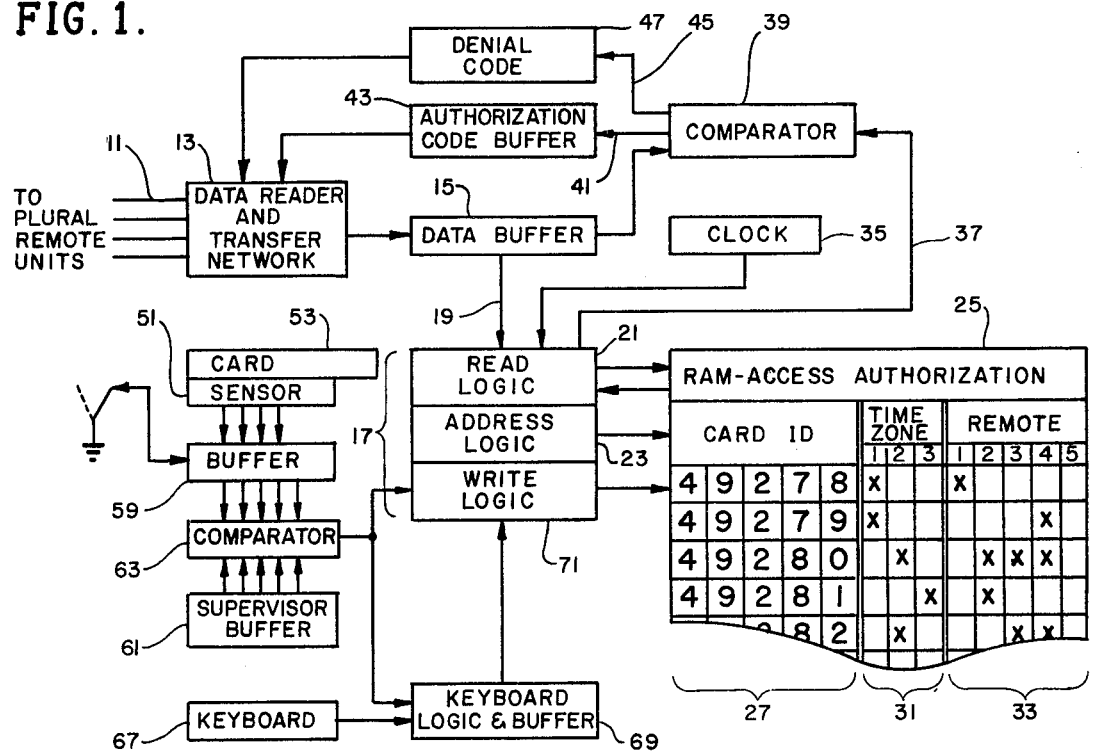

Referring initially to FIG. 1, the central processor of an on-line security system is shown. This central processor is connected by plural lines 11 to plural remote terminals which are located at plural remote locations where access is to be selectively controlled. More specifically, a data reader and transfer network 13 is used to clock data into and out of the central processor for communication with plural remote units. In addition, the data reader and transfer network 13 will typically provide polling pulses to each of the plural remote units on the communication lines 11 in order to permit the plural remote units to communicate sequentially, one at a time, with the central processor of FIG. 1.

When a remote unit is activated by the insertion of a data card into a sensor device (see U.S. Pat. No. 4,004,134 for detailed description), the card data is transferred by lines 11 to the data reader 13 and is, in turn, clocked into a data buffer 15 at the central processor. This data in the data buffer, which defines the identification number of the individual wishing to gain access and defines, in addition, the remote terminal at which access is desired, is coupled to a memory addressing and control circuit 17 by means of a multiple line connector 19. More specifically, the data from the buffer 15 is supplied to the read logic portion 21 of the memory addressing and control unit 17 and is used to control, in turn, the address logic portion 23 of the memory control 17. The address logic portion 23 provides an address for a read and write memory 25 which forms the system control storage, and thus stores data relating to selective access. More specifically, the read and write memory 25 provides data storage in which plural columns 27 provide a memory address which is identical to the identification number from particular personnel cards. Following these identification numbers, the memory 25 stores time zone identification data 31 which defines particular times of day during which a particular employee is permitted access. Following the time zone data 31, the memory 25 supplies data 33 defining which remote terminals shall be open to a particular person. It will be understood, of course, that a particular card ID number may appear more than once in the memory 25 to provide access at different remote locations at different times of day.

In response to input data from the data buffer 15, as well as input data from a clock 35, the address logic 23 selects a particular address location in the memory 25 which is identical to the card ID number in the data buffer 15 and the time code provided by the clock 35. Data identifying the remote terminals 33 at which access is permitted is then read from the memory 25 by means of read logic 21 and is supplied, in turn, by means of line 37 to a comparator 39.

The comparator 39 also receives from the data buffer 15 data identifying the remote location from which the data transfer was received at the data reader 13. If the remote terminal from which the communication was received is listed in the data 33 provided by the read logic 21 as a terminal at which access is to be permitted, the comparator 39 will provide a signal on line 41. This signal is supplied to an authorization code buffer 43 which will supply the data transfer network 13 with an authorization code to be transmitted to the remote unit which initiated the request. Such an authorization code is used to indicate that authorization is to be permitted. If, on the other hand, the data identifying the remote terminal is not listed in the data 33 as a terminal at which access is to be permitted, the comparator 39 will provide a signal on line 45 to a denial code buffer 47 which will output to the data transfer network 13 a code which will order the remote terminal to deny access at the remote location.

The read and write memory 25 is the central element of the system which has been described, since it stores all of the data required to determine who shall have access at what remote terminals during selected times of day. A supervisor utilizing this system must be able to program the data in the memory 25 to facilitate changes in work schedules, hiring and firing of employees, etc. At the same time, however, unauthorized personnel must be prevented from programming access to the memory 25, since the ability to program this memory 25 would allow unauthorized persons to have access to any remote location they might choose, simply by changing the program data 31 and 33 following their identification number 27.

The present invention limits programming access to the memory 25 by providing a data sensor 51 which is responsive to magnetically encoded data on a data card 53. The card 53 is inserted by a person wishing to gain programming access at the central terminal of FIG. 1. The card 53 is inserted into a housing (not shown) within which are plural sensors. The card 53 is typically spot magnetized so that the poles of all spots are perpendicular to the card faces. When the card is fully inserted in the housing, each such spot is coaxial with a respective sensor. Sensors employed preferably are the type having a coil wound on a core of saturable material of high initial permeability requiring a sufficiently low magnetomotive force to saturate it that the spot of a card will affect such saturation. See U.S. Pat. Nos. 3,686,479 and 3,717,749, assigned to the same assignee as the present application.

When a voltage pulse is applied to such a coil, the decay thereof is slower in the presence of an opposing spot field than the decay of a pulse in the presence of an aiding field. By way of logic devices coupled to the coils, respective binary logic level outputs are derived for the aiding and opposing relationships. The sensors 51 thus provide data identical to that magnetically encoded on the card 53. A switch 55 senses the complete insertion of the card 53 into the system and is used, by means of line 57, to strobe data from the sensor 51 into a data buffer 59. This data, once in the buffer 59, is compared with data permanently stored in the system in a supervisor's buffer 61, this data identifying the individual or individuals who are entitled to access to the system for programming the memory 25. If the data in the buffer 61 is identical to the data in the buffer 59, a comparator 63 will provide a signal on line 65.

The system additionally includes a keyboard 67 which is used for inputting data for programming purposes into the central processor. The keyboard 67 supplies data to a keyboard logic and buffer network 69 which transforms the data from the keyboard 60 into a form which may be written into the memory 25. The signal on line 65 enables both the keyboard logic and buffer network 69 as well as the write logic portion 71 of the memory addressing and control circuit 17. Once enabled, data from the keyboard 67 will be supplied by the keyboard logic buffer 69 and write logic 71 to supply data to the memory 25 defining time zones and remote locations for the authorization access of particular personnel ID numbers 27.

From the foregoing description, it will be seen that, without the insertion of a supervisor's card 53 into the system, the write logic portion 71 of the program control 17 cannot be activated, nor can the keyboard logic 69, so that it will be impossible for unauthorized personnel to address the memory 25 to make alterations therein.

It will be understood by those skilled in the art that, rather than a separate buffer 59 and comparator 63, it is possible to store the supervisor's card as a separate index listing in the memory 25 to control access for programming purposes based on a listing which is a part of the memory 25. In this preferred embodiment, however, the separate buffer 61 and comparator 63 are utilized.

A similar system to that described in reference to FIG. 1 can be implemented in a system which includes only stand-alone or off-line remote terminals. Such systems, rather than providing selective access control through a central processor, include access data listings in each of the remote terminals. The information in these listings often differs from terminal to terminal to give selected access throughout a facility at various remote locations and various times to selected personnel. Such a system incorporating the present invention is shown in FIG. 2.

As in the prior system, a personnel identification card 53 is inserted into the remote terminal and, when fully inserted, activates a switch 55, which is used to provide a signal on line 57 to clock the data from the card 53 by means of a sensor 51 into a card data buffer 59.

Figure 2:
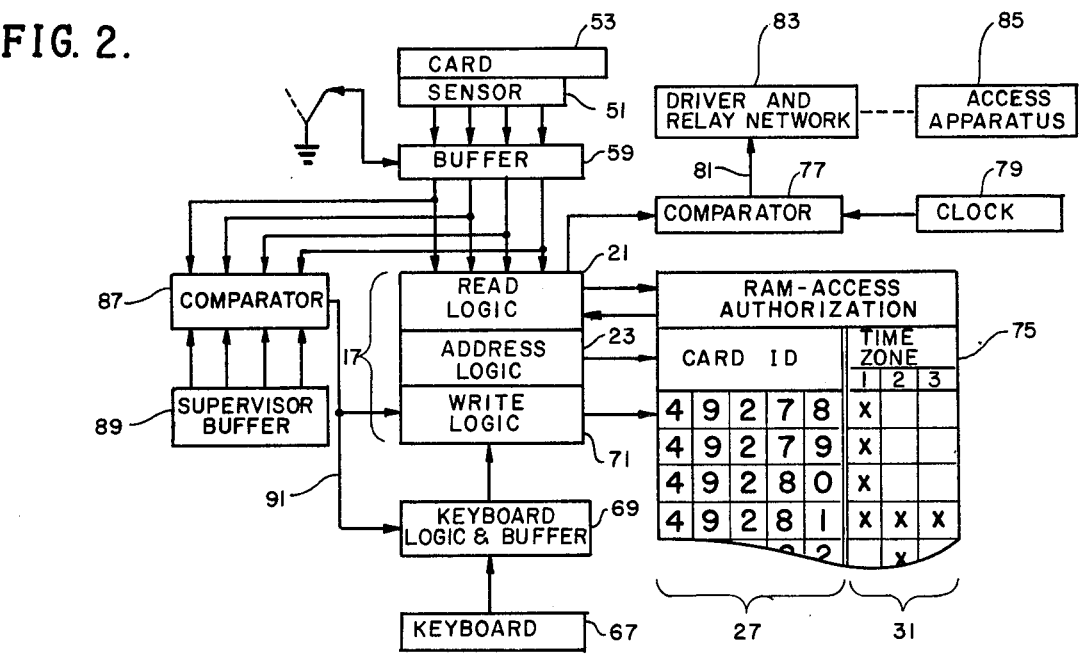

Data from the buffer 59 is used in most circumstances to control personnel access at the particular remote terminal of FIG. 2. Thus, under most circumstances, data from the buffer 59 is supplied directly to the read logic portion 21 of the memory address and control circuit 17 and is, in turn, supplied to the address logic 23 to address a particular location in a read and write memory 75. This read and write memory is similar to the memory 25 of FIG. 1, except that it includes only a card identification data portion 27 and a time zone data portion 31. No remote location identification 33 (FIG. 1) is required, since each remote location controls access off-line.

Thus, in this instance, data from the card 53 is placed in the buffer 59 and is used, by means of the read logic 21 and address logic 23, to address a particular location in the memory 27. From this location, time code authorization data 31 is supplied to the read logic 21 and, by means of this logic 21, to a comparator 77. This comparator 77 compares the time code data with data from a clock 79 to determine whether the employee identified by the ID number from the buffer 59 is entitled to access at this particular time of day. In response to this code, if access is to be permitted, an output signal on line 81 from the comparator 77 energizes a driver and relay network 83 to operate access apparatus 85, such as a solenoid operated door strike, to provide access.

Data from the buffer 59 is simultaneously compared in a comparator 87 with data from a supervisor's identification buffer 89. The buffer 89 provides permanent storage in the system for the ID number of the programmer or supervisor who is to be granted access to the memory 75. If the supervisor's card is inserted, the comparator 87 will provide an enable signal on line 91 which will enable the write logic portion 71 of the memory address and control circuit 17 and, at the same time, will enable a keyboard logic and buffer network 69, so that the supervisor can input data by means of a keyboard 67 into the memory 75. The keyboard 67, buffer 69, and right logic 71 are identical to that described in reference to FIG. 1.

Once having granted access to a supervisor, the system permits the supervisor, by means of the keyboard 67, to change the time code authorization portion 31 or employee ID number 27 in the memory 75 to change the list of personnel who have access at specific times at this particular remote terminal. Each time a card 53 is inserted into the system, it selectively provides access through the access apparatus 85 in accordance with data stored in the memory 75 and the time of day as defined by the clock 79, and also compares this data to determine whether a supervisor's card is inserted. Once the supervisor's card is inserted into the system, the keyboard 67 can be utilized to program the memory 75.

It will be seen from the on-line and off-line systems described, that in either case, access to the processor for programming purposes is controlled by card encoded data so that the security of the overall system can be protected while still permitting the convenient programming of the memories 25 and 75 by a supervisor or programmer.

What is claimed is:

1. Apparatus for limiting programming access in a security system which provides selective access at plural remote locations based on stored data in response to data on an encoded card, comprising:
   a first plurality of data encoded cards identifying a first plurality of personnel;
   a second data encoded card identifying a second person;
   means for selectively providing access to each of said plural remote locations, said means comprising:
      data storage means defining which of said first plurality of cards shall permit access to which of said plural remote locations; and
      means for reading data encoded on said first plurality of cards, for comparing said data with said data storage means, and for providing selective access based upon said comparison; and
   means permitting alteration of said data storage means in response to said second data encoded card.

2. Apparatus for limiting programming access in a security system as defined in claim 1 wherein said data storage means is located at a central processor, said apparatus further comprising:
   a communication network for providing communication between said central processor and said plural remote locations, said means permitting alteration of said data storage means being located at said central processor.

3. Apparatus for limiting programming access as defined in claim 1 wherein said data storage means is located at each of said plural remote locations.

4. Apparatus for limiting programming access as defined in claim 1 wherein said means permitting alteration comprises:
   storage means for storing data identifying said second person; and
   means comparing data from said storage means with data from said second data encoded card, said means providing a signal for permitting alteration of said data storage means.

5. Apparatus for limiting programming access in a security system as defined in claim 1 wherein said data storage means additionally defines time zones during which said first plurality of cards shall permit access to which of said plural remote locations.

6. Apparatus for limiting programming access as defined in claim 1 wherein said data storage means is a read and write memory connected to a write control logic circuit and wherein said means permitting alteration of said data storage means enables said write control logic circuit.

7. Apparatus for limiting programming access in an encoded data card security system, comprising:
- a read and write memory storing data defining which of plural persons will be permitted access at a secured location;
- means for reading a magnetically encoded data card and for comparing data on said card with stored data to provide an authorization signal; and
- means responsive to said authorization signal for permitting alteration of said read and write memory.

8. Apparatus for limiting programming access as defined in claim 7 additionally comprising:
- a keyboard for altering said read and write memory, said keyboard being enabled by said authorization signal.

9. Apparatus for limiting programming access as defined in claim 7 wherein said means for reading a magnetically encoded data card comprises:
- a sensing circuit responsive to said magnetically encoded card;
- a data storage device for storing an authorization code; and
- means for comparing said authorization code with data from said sensing means for providing said authorization signal.

10. Apparatus for limiting programming access as defined in claim 7 wherein said read and write memory stores data listing plural persons whose access is to be controlled, said listing including data defining times of day when access is to be permitted in association with each such person.

11. Apparatus for limiting programming access as defined in claim 10 wherein said read and write memory further stores data defining which of plural remote locations will provide access, said data being associated with each of said plural person data.

12. A method of controlling access to a read and write memory in a security system, said read and write memory storing data specifying which of plural personnel will be provided access at plural remote locations, comprising:
- reading data from a magnetically encoded data card to provide an identification signal;
- reading data from a storage buffer to provide an authorization signal;
- comparing said identification signal with said authorization signal to provide an access signal; and
- controlling operation of a circuit used for writing data into said read and write memory in response to said access signal.

13. A method of controlling access to a read and write memory as defined in claim 12 wherein said controlling step enables a programming keyboard.

* * * * *